US006556631B1

(12) United States Patent
Yamamoto et al.

(10) Patent No.: US 6,556,631 B1
(45) Date of Patent: Apr. 29, 2003

(54) RDS DATA DEMODULATOR CAPABLE OF PRECISELY ATTENUATING ARI SIGNAL

(75) Inventors: Yuji Yamamoto, Kawagoe (JP); Terukazu Kobayashi, Kawagoe (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/259,286

(22) Filed: Mar. 1, 1999

(30) Foreign Application Priority Data

Mar. 2, 1998 (JP) .......................................... 10-066262

(51) Int. Cl.[7] ............................................... H04L 27/06

(52) U.S. Cl. ....................................... 375/340; 375/316

(58) Field of Search ................................ 375/340, 324, 375/316; 340/905; 455/45, 186.1

(56) References Cited

FOREIGN PATENT DOCUMENTS

JP 62-206929 9/1987
JP 9-74364 3/1997

OTHER PUBLICATIONS

S.R. Ely et al., Design Principles for VHF/FM radio receivers using the EBU radio–data system RDS, EBU Review—Technical, pp. 50–58 (Apr. 1984).

*Primary Examiner*—Chi Pham
*Assistant Examiner*—Demetria Williams
(74) *Attorney, Agent, or Firm*—Morgan, Lewis & Bockius LLP

(57) ABSTRACT

An RDS data demodulator includes an analog-to-digital converter for converting an analog FM signal into a digital FM modulation signal; a first filter having a transfer zero point at a predetermined frequency, for receiving the digital FM modulation signal and for attenuating an information modulation signal; a second filter having a pass band characteristic at the predetermined frequency, for receiving a filter output signal from the first filter and for extracting an RDS modulation signal; and RDS demodulating means for demodulating the RDS modulation signal from the second filter to output both an RDS data signal and a reproduction clock signal used to demodulate the RDS data signal.

7 Claims, 5 Drawing Sheets

RDS DATA DEMODULATOR CAPABLE OF PRECISELY ATTENUATING ARI SIGNAL

This application claims the benefit of Japanese application no. 10-66262 filed on Mar. 2, 1998, which is hereby incorporated by reference.

BACKGROUND OF TIE INVENTION

1. Field of the Invention

The present invention relates to a data demodulator, and more particularly, to a data demodulator for demodulating the radio data system (RDS) broadcast operable in Europe.

2. Description of the Related Art

The Auto-fahrer Rundfunk Informations (ARI) broadcast system is popularized as one of the information providing services capable of mitigating traffic jam problems in Europe. In the ARI broadcast system, a broadcast station for broadcasting the road traffic information multiplexes a subcarrier having a frequency of 57 kHz, i.e., an "SK signal," onto a speech signal. A receiver including a detection unit can recognizing this SK signal. This detection unit can detect as to whether or not a traffic information broadcasting program can be received from the presently tuned broadcast station based upon this SK signal detection result.

Furthermore, the amplitude of this subcarrier is modulated by using a specific frequency. The receiver can recognize that broadcasting of the regional information and the traffic information is commenced or finished by detecting this specific frequency. The signal regarding the regional information is referred to as the "BK signal," and the signal regarding the start/end of the traffic information is referred to as the "DK signal." The combination of the SK signal, BK signal, and DK signal is called the ARI modulation signal.

The RDS broadcast system is also known in this field. The RDS broadcast system is further developed from the above-explained ARI broadcast system, and is capable of providing various information services in the format of digital data. The technical specification of the RDS broadcast system is standardized by European Broadcasting Union (E.B.U.). On the transmission side, the transmission data is differentially encoded, and then a clock signal having the frequency of 1.1875 kHz is modulated in a 2-phase PSK modulation manner by using the differentially-encoded signal. Furthermore, the amplitude of the 57 kHz signal corresponding to the subcarrier is modulated in a subcarrier suppression type amplitude modulation manner by using this 2-phase PSK modulation signal. Then, a double-side-band (DSB) signal is multiplexed onto a speech signal. This double-side-band signal is referred to as an "RDS modulation signal."

A receiver demodulates the DSB signal transmitted in accordance with the above-described technical specification, and is synchronized with the data in accordance with rules of E.B.U., so that the receiver can decode the message. It should be noted that the subcarrier of the RDS modulation signal has an in-phase relationship, or a quadrature-phase relationship with the third higher harmonic wave of the pilot signal (19 kHz) indicative of the stereophonic broadcasting program.

Both the RDS signal and the ARI signal can be simultaneously transmitted. For such a simultaneous transmission, the respective subcarriers are set to the same frequency of 57 kHz, and the quadrature-phase relationship can be continuously established between the phases of these carriers. The frequency shift of the RDS modulation signal with respect to the main carrier is usually +2 kHz to −2 kHz However, in the case that both the RDS modulation signal and the ARI modulation signal are transmitted at the same time, the frequency shift of the RDS modulation signal with respect to the main carrier is set to +1.2 kHz to −1.2 kHz, whereas the frequency shift of the ARI signal with respect to the main carriers set to +3.5 kHz to −3.5 kHz.

In FIG. 3, there is shown a spectrum of an RDS modulation signal 2 and a spectrum of an ARI modulation signal 3, which are multiplexed on a speech signal 1. To recognize such an RDS modulation signal on a.receiver side, a demodulator designed for this specific purpose is required. This demodulator will now be explained with reference to FIG. 4 which shows a schematic block diagram of a conventional RDS data demodulator. This conventional RDS data demodulator includes a filter means 4 and an RDS demodulating means 5. The filter means 4 extracts an RDS modulation signal 7 from an analog FM demodulation signal 6 which is demodulated by using the analog signal processing technique. The RDS modulation signal 7 is outputted from the filter means 4. The RDS demodulating means 5 demodulates this output signal from the filter means 4 to derive an RDS data signal and a reproduction clock signal used to demodulate the RDS data.

In general, the filter means 4 employs an analog filter such as a switched capacitor circuit. At the output terminal of this filter means 4, the RDS modulation signal 7 which has been separated from the speech (audio) signal is outputted. It should also be understood that when the RDS modulation signal and the ARI modulation signal are simultaneously broadcasted from the broadcast station, both the RDS modulation signal and the ARI modulation signal are outputted at the same time.

Both the extracted RDS modulation signal and the extracted ARI modulation signal are supplied to the RDS demodulating means 5. The RDS demodulating means 5 contains a costas loop type PLL for demodulating the DSB signal. As shown in FIG. 5, the costas loop type PLL includes multipliers 8 and 9, a phase comparator 10, a loop filter 11, and a VCO 12. This type of PLL circuit carries out synchronization even when there is no subcarrier. That is, a synchronization can be established when the subcarrier becomes 0 degree, or 90 degrees with respect to the VCO. Consequently, such a PLL circuit is suitable for demodulating an RDS modulation signal having no subcarrier.

In the above-explained conventional RDS data demodulator, if only a RDS modulation signal is transmitted, the RDS modulation signal, which has been DSB-demodulated, is outputted as the synchronization-detection output 13. If both the RDS modulation signal and the ARI modulation signal are transmitted at the same time, such an RDS modulation signal, which has been DSB-demodulated, is outputted as the quadrature detection output 14. This is because when both the ARI modulation signal and the RDS modulation signal are transmitted at the same time, only the ARI modulation signal is synchronized since the modulation factor of the ARI modulation signal is higher than that of the RDS modulation signal. As a result, the RDS modulation signal having the quadrature-relationship with the ARI modulation signal is outputted as the quadrature modulation output 14.

Accordingly, when the costas loop type PLL circuit is used, one has to switch the ARI modulation signal and the RDS modulation signal in order to deal with simultaneous transmission of the ARI modulation signal and the RDS modulation signal. Japanese Unexamined Patent Publication No. 62-206929 discloses an improved method capable of switching the ARI modulation signal and the RDS modulation signal. As shown in FIG. 5, in a method disclosed in the above-referenced Patent Publication, an ARI signal detecting circuit 15 is provided to receive the synchronization-detection output 13 of the costas loop type PLL circuit for judging whether or not the ARI signal is present. Furthermore, a signal switching circuit 16 is employed to select between the synchronization-detection output 13 and the quadrature-detection output 14. In response to a judgment result made by the ARI signal detecting circuit 15, either the synchronization-detection output 13 or the quadrature-detection output 14 is outputted from the signal switching circuit 16 to a post-stage circuit (not shown), so that the RDS signal which has been DSB demodulated is derived.

However, this conventional circuit arrangement has the following problems. When both the RDS modulation signal and the ARI modulation signal are transmitted at the same time, the RDS signal cannot be derived until the ARI signal is detected by the ARI signal detecting circuit 15. Therefore, a lengthy time period is required to obtain the RDS data.

In addition, even when only the RDS modulation signal is transmitted, the above-explained costas loop type PLL circuit would be locked to a third higher harmonic wave. This third higher harmonic wave is produced when the pilot signal having the frequency of 19 kHz and indicative of the stereophonic broadcasting program is distorted due to a multi-path phenomenon. Therefore, the ARI signal detecting circuit 15 erroneously detects an ARI signal. As a result, the signal switching circuit 16 makes the wrong selection in accordance with the wrong result from the ARI signal detecting circuit 15.

As seen from the above descriptions, it would be desirable to separate the ARI modulation signal from the RDS modulation signal before the signals enter the RDS demodulating means 5. It would also be desirable to provide only the RDS modulation signal to the RDS demodulating means 5 for obtaining the RDS data.

As one example of methods capable of separating the ARI modulation signal from the RDS modulation signal, the technical publication "Design principles for VHF/FM radio receivers using the EBU radio&ta system RDS" of E.B.U. has proposed a filter means including a delay circuit with a CCD (charge-coupled device). Such a filter means is capable of attenuating the ARI modulation signal.

However, as illustrated in the spectrum in FIG. 3, since the ARI modulation signal is located very close to the RDS modulation signal, a filter having a high Q is required in order to attenuate only the ARI modulation signal. Thus, the above-proposed method has a problem in that its pass-band blocking frequency fluctuates due to the circuit elements used. Also, the size of the circuit is increased. Consequently, such a filter means is not appropriate for mass production.

SUMMARY OF THE INVENTION

Accordingly, the present invention is directed to a RDS data demodulator that substantially obviates one or more of the problems due to limitations and disadvantages of the related art.

An object of the present invention is to provide an RDS data demodulator capable of attenuating an ARI signal in high precision without increasing a circuit size.

Another object of the present invention is to provide an RDS data demodulator capable of acquiring RDS data continuously under stable condition irrespective of presence or absence of an ARI modulation signal. The RDS data demodulator of the present invention no longer uses the ARI signal detecting circuit and the signal switching circuit, which are employed in the conventional RDS data demodulator.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an RDS data demodulator of the present invention includes an analog-to-digital converter for converting an analog FM signal into a digital FM modulation signal; a first filter to which the digital FM modulation signal is supplied, having a transfer zero point at a predetermined frequency, and for attenuating an information modulation signal; a second filter to which a filter output signal of the first filter is supplied, having a pass band characteristic at the predetermined frequency, and for extracting an RDS modulation signal; and RDS demodulating means for demodulating a filter output signal of the second filter so as to output both an RDS data signal and a reproduction clock signal used to demodulate the RDS data.

According to a second aspect of the present invention, in the RDS data demodulator described above, a signal processing time period of the first filter is carried out at a frequency higher than that of a subcarrier of the RDS signal by four times; and a term "$Z^{-1}$" of the denominator of a transfer function of the first filter is equal to zero.

According to a third aspect of the present invention, in the RDS data demodulator described above, a signal processing time period of the second filter, instead of the first filter, is carried out at a frequency higher than that of a subcarrier of the RDS signal by four times; and a term "$Z^{-1}$" of the denominator of a transfer function of the second filter is equal to zero.

The RDS data demodulator of the present invention operates as follows. In this RDS data demodulator, an analog FM demodulation signal demodulated by way of an analog signal processing technique is converted into a digital FM demodulation signal 19 by an analog-to-digital (A/D) converter 18 for converting the analog FM demodulation signal into the corresponding digital FM demodulation signal. A signal 21 with an ARI modulation signal attenuated from the digital FM modulation signal 19 is produced from a first infinite impulse response type filter 20. This first infinite impulse response type filter 20 has a transmission zero point at a frequency of 57 kHz, and is capable of attenuating the ARI modulation signal. Then, a this signal 21 with the ARI modulation signal attenuated is inputted to a second infinite impulse response type filter 22. This second infinite impulse response type filter 22 has a pass band characteristic at a frequency of 57 kHz, and is capable of extracting an RDS modulation signal. The sufficiently attenuated ARI modulation signal is then supplied to the RDS demodulating circuit 24. Consequently, even when both the RDS modulation signal and the ARI modulation, signal are transmitted at the same time, the ARI signal is no longer detected. Furthermore, the RDS modulation signal is no longer adversely influenced by the noise. As a result, the demodulated signal is more reliable.

Also, since the infinite impulse response type filter is used, such a filter having a high Q is capable of attenuating only the ARI modulation signal. Moreover, the pass-band blocking frequency is not fluctuated due to the circuit elements used. Also, the circuit size is small.

In addition, since the signal processing time period of the first infinite impulse response type filter is selected so that its frequency is higher than that of the subcarrier of the RDS signal, the term "$Z^{-1}$" of the denominator in this transfer function can be made zero. As a result, the frequency of the transfer zero point can be made coincident with the subcarrier of the ARI modulation signal. Consequently, there are no quantization errors specific to a digital filter, the ARI signal can be attenuated in high precision, and also the hardware size can be reduced.

Similarly, since the signal processing time period of the second infinite impulse response type filter is selected so that its frequency is higher than that of the subcarrier of the RDS signal, the term "$Z^{-1}$" of the denominator in this transfer function can be made zero. Accordingly, the frequency of the pass band can be made coincident with the subcarrier of the ARI modulation signal. As a result, there are no quantization errors specific to a digital filter, the RDS signal can pass through the second infinite impulse response type filter in high precision, and the associated hardware size can be reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
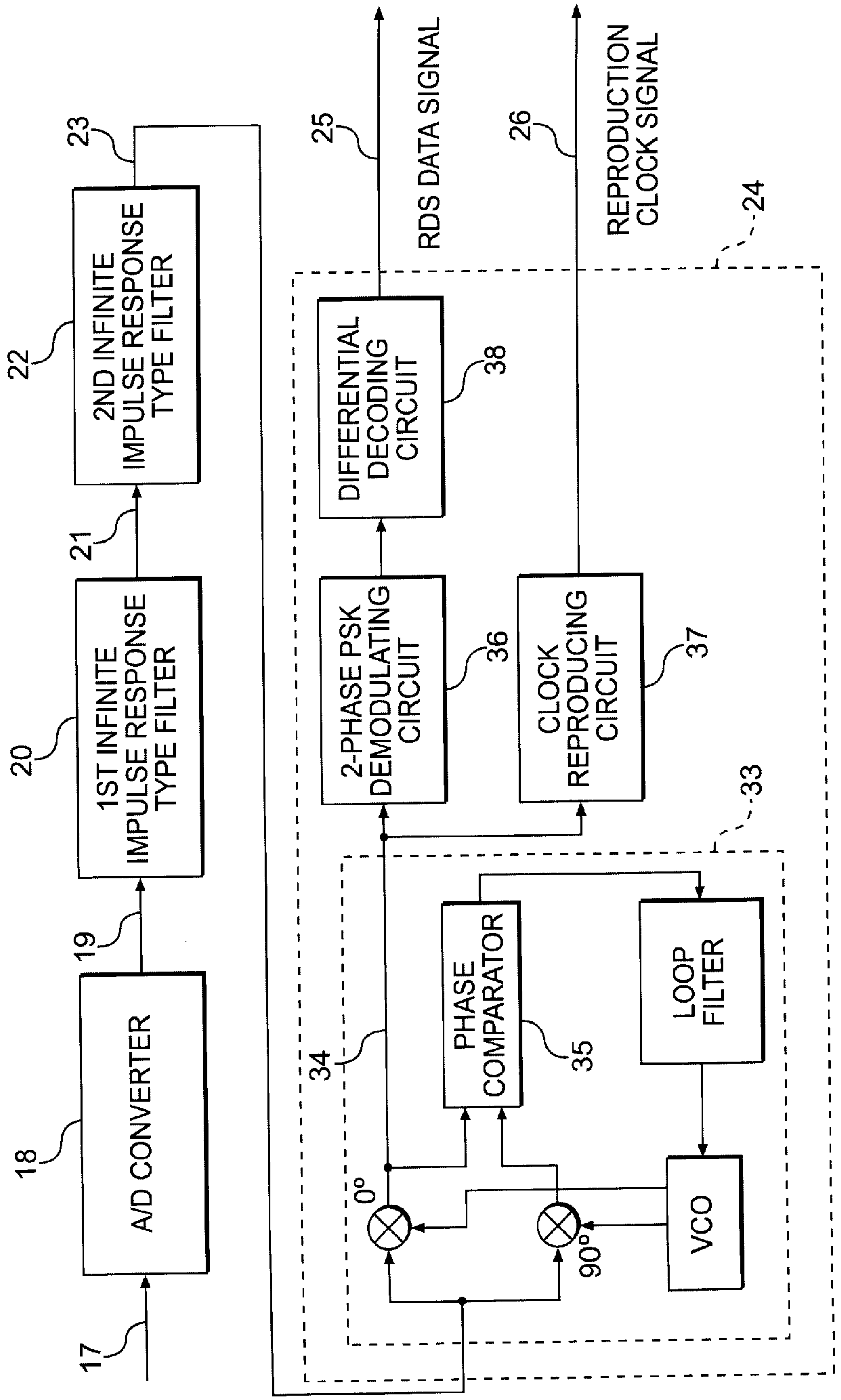
FIG. 1 is a schematic block diagram of an RDS data demodulator according to an embodiment of the present invention.

FIG. 1 schematically illustrates a circuit arrangement of an RDS data demodulator according to a preferred embodiment of the present invention. In this RDS data demodulator, an analog FM demodulation signal 17 is initially demodulated by using an analog signal processing technique, and then is converted into a digital FM demodulation signal 19 by an analog-to-digital (A/D) converter 18.

The digital FM demodulation signal 19 is then provided to a first infinite impulse response type filter 20. The first infinite impulse response type filter 20 has a transmission zero point at a frequency of 57 kHz, and is provided mainly for attenuating the ARI modulation signal. The first infinite impulse response type filter 20 attenuates an ARI modulation signal in the digital FM modulation signal 19 and outputs a signal 21. Then, the signal 21 is supplied to a second infinite impulse response type filter 22. The second infinite impulse response type filter 22 has a pass band characteristic at a frequency of 57 kHz, and is provided mainly for extracting an RDS modulation signal 23 from the signal 21. The RDS modulation signal 23 is outputted from the second infinite impulse response type filter 22 and supplied to an RDS demodulating circuit 24. Here, the RDS modulation signal 23 contains the ARI modulation signal because the frequency bands of both are the same. However, the component of the ARI modulation signal has already been sufficiently attenuated at this point.

The RDS demodulating circuit 24 demodulates the RDS demodulation signal 23 and supplies an RDS data signal 25 and a reproduction clock signal 26, which is used for demodulating the RDS data, to a post-stage circuit (not shown in figures). Since the operation of the RDS demodulating circuit 24 is similar to that of the conventional RDS demodulator, a detailed description thereof is omitted.

Figure 2:
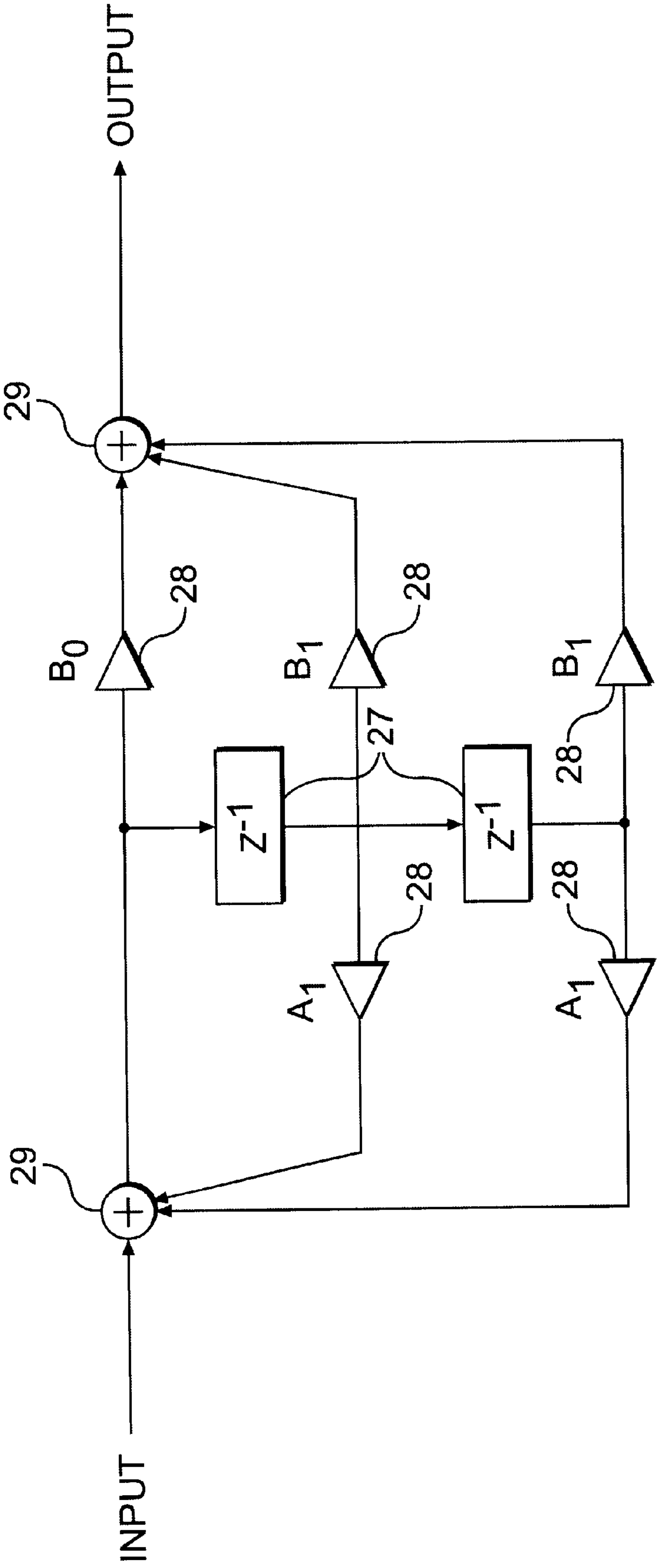
FIG. 2 is a signal diagram of an infinite impulse response type filter employed in the RDS data modulator of FIG. 1.
Figure 3:
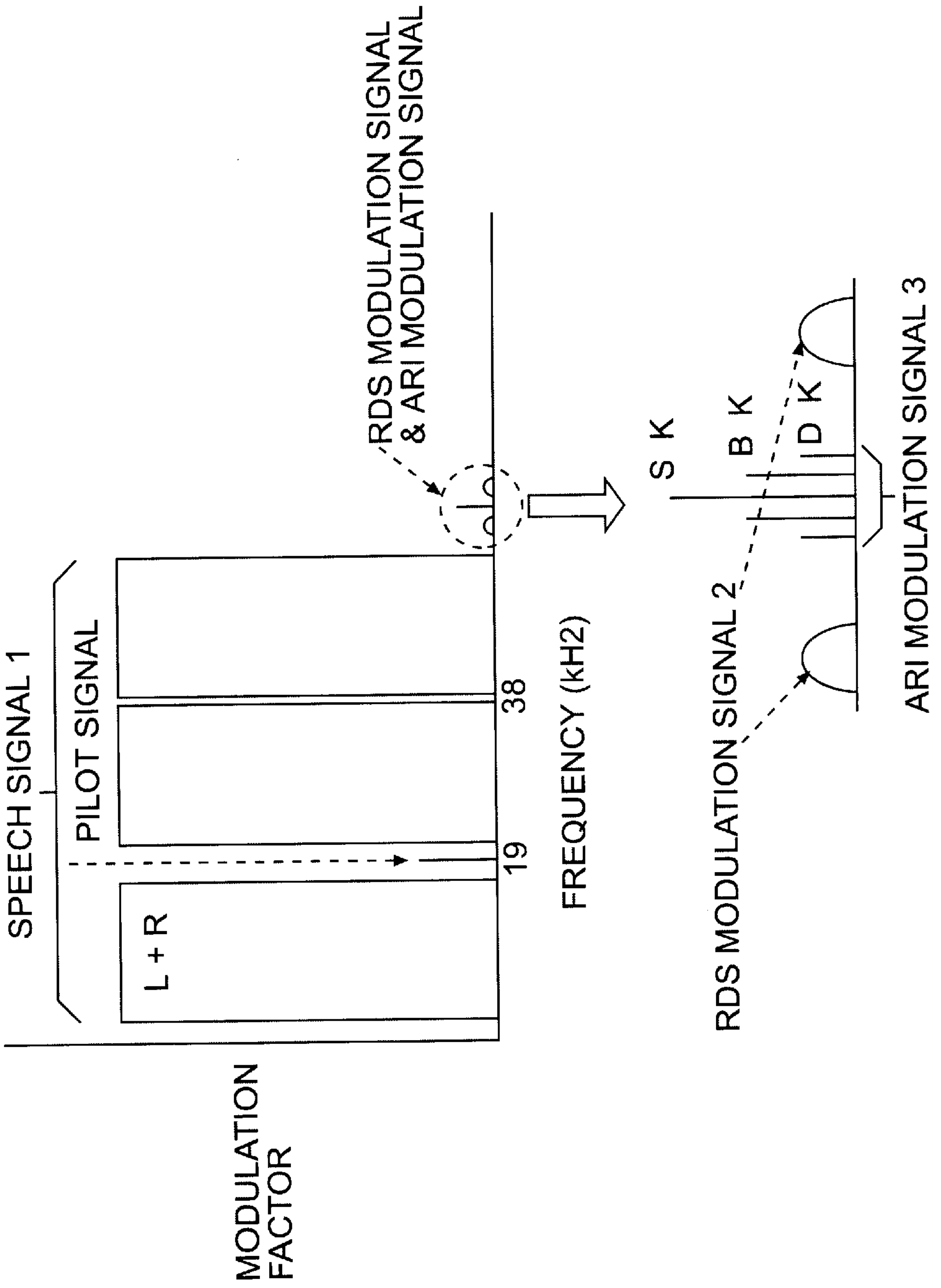
FIG. 3 shows spectra of an RDS modulation signal and an ARI modulation signal, which are multiplexed on an audio signal.
Figure 4:
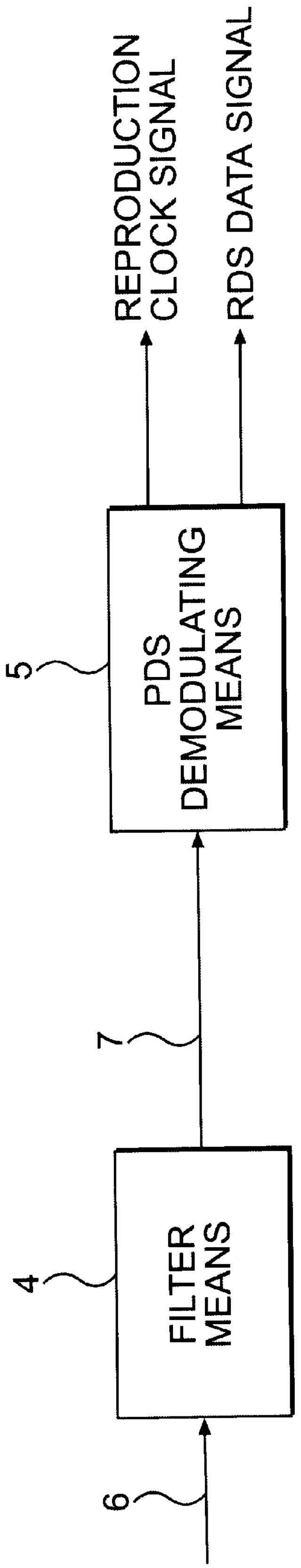
FIG. 4 PRIOR ART
FIG. 4 schematically shows the arrangement of a conventional RDS data demodulator.
Figure 5:
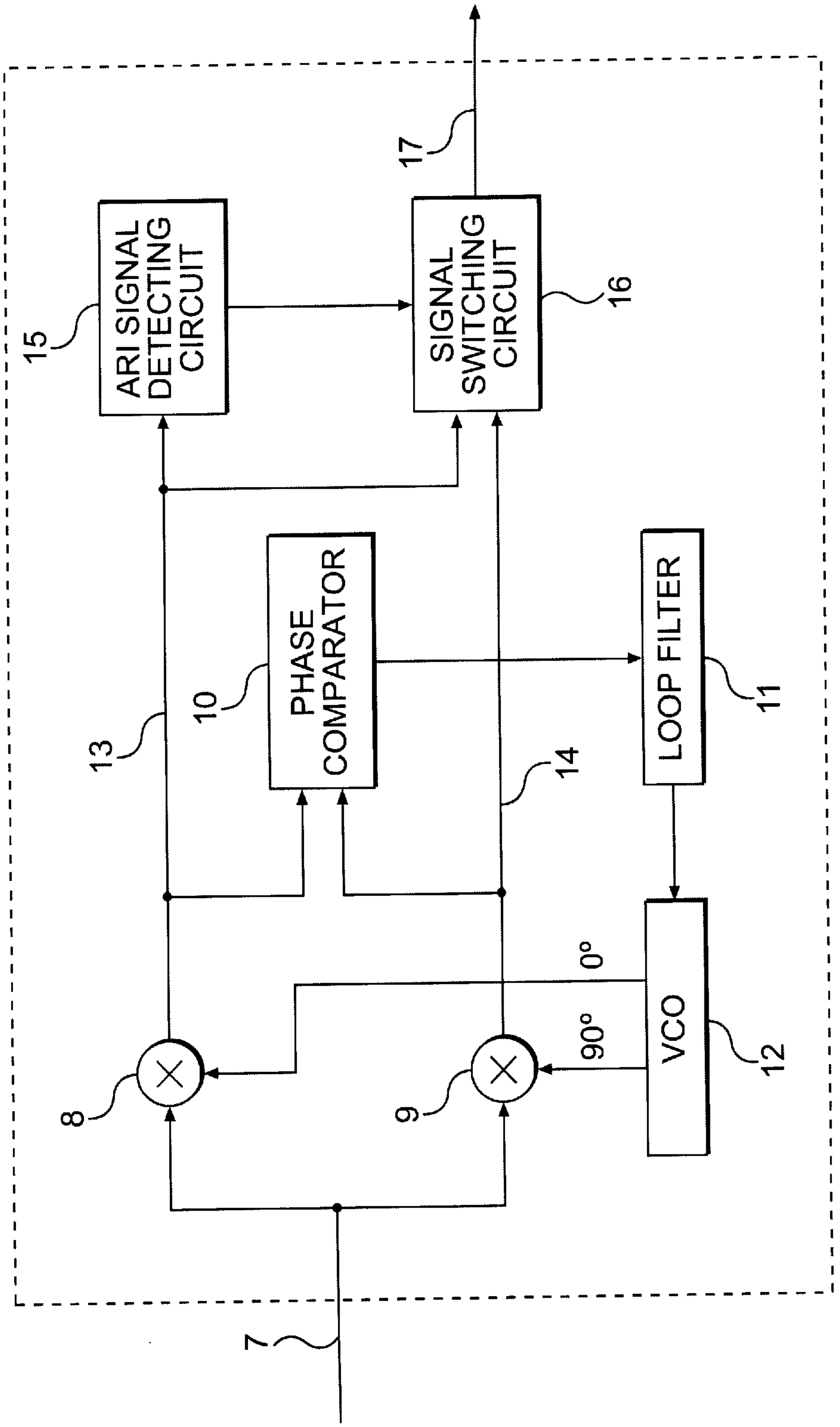
FIG. 5 PRIOR ART
FIG. 5 is a schematic block diagram of the conventional costas loop type PLL circuit.

FIG. 2 is a signal diagram of an infinite impulse response type filter used in the RDS data demodulator of the present invention.

As shown in FIG. 2, the infinite impulse response type filter includes delay circuits 27 for delaying an input signal by a time period corresponding to 1 sampling timing (1/F), coefficient multipliers 28 for multiplying the input signal by coefficients ($A_1$, $A_2$, $B_0$, $B_1$, $B_2$), and adders 29 for adding a plurality of inputs respectively to generate an output result. A transfer function H(Z) of the infinite impulse response type filter is expressed by the following formula (1):

$$H(Z)=(B_0+B_1Z^{31\ 1}+B_2Z^{-2})/(1-A_1Z^{-1}-A_2Z^{-2}) \quad (1).$$

For the infinite impulse response type filter shown in FIG. 2, different types of filters may be realized by employing different coefficients ($A_1$, $A_2$, $B_0$, $B_1$, $B_2$) in the coefficient multipliers 28. For instance, if an infinite impulse response type filter having a band-pass type filter characteristic is desired, a transfer function $H_{BPF}$ is given by the following formula (2):

$$H_{BPF}(Z)=B(1-Z^{-2})/(1-A_1Z^{-1}-A_2Z^{-2}) \quad (2).$$

If an infinite impulse response type filter having a band-block type filter characteristic is desired, a transfer function $H_{BEF}$ is given by the following formula (3):

$$H_{BEF}(Z)=B(1+Z^{-2})/(1-A_1Z-A_2Z^{-2}) \quad (3).$$

In FIG. 1, the first infinite impulse response type filter 20 is arranged based on the transfer function $H_{BEF}$ in formula (3), whereas the second infinite impulse response type filter 22 is arranged based on the transfer function $H_{BPF}$ in formula (2). In this embodiment, the respective coefficients in formulae (2) and (3) have the following meanings. The coefficient "$A_1$" is a factor for determining a pass-band blocking frequency, or a pass-band central frequency of the filter. The coefficient "$A_2$" is a factor for determining "Q" of the filter. The coefficient "B" denotes an element used to determine an amplification factor of input/output in a pass band. Alternatively, the filters based upon the transfer functions $H_{BEF}$ and $H_{BPF}$ of the above-described formulae (2) and (3) may be cascade connected, if desired.

The digital filter shown in FIG. 2 has a highly precise filtering characteristic, as compared with the conventional analog filters such as a switched capacitor circuit. This is because the calculations (namely, multiplication of coefficients) are carried out with digital processing operations and there is no fluctuation in the circuit elements. Consequently, such a digital filter is ideal to be used for attenuating the ARI modulation signal, and for extracting the RDS modulation signal. This also allows a small number of circuit elements to be used for performing these functions.

It should be noted that a sampling period (1/F) is also a majors factor for determining a filtering characteristic. In particular, in the RDS demodulator of the present invention, the sampling frequency "F" is selected to be a frequency higher than 57 kHz (namely, the subcarrier of RDS modulation signal) by 4 times. In addition, the parameter "$A_1$" in the transfer functions $H_{BEF}$ and $H_{BPF}$ defined by the formulae (2) and (3) is set to "0." As a result, the pass-band central frequency of the band pass type filter according to the transfer function $H_{BPF}$ of the formula (2) is selected to be 57 kHz, so that this central frequency is made coincident with the frequency of the subcarrier of the RDS modulation signal. Similarly, the pass-band blocking frequency of the pass-band block (stop) type filter according to the transfer function $H_{BEF}$ of the formula (3) also becomes 57 kHz, which coincides with the frequency of the subcarrier of the ARI modulation signal.

The fact that the parameter "$A_1$" equals to "0" implies that the parameter "$A_1$" is not adversely influenced by quantization errors. In other words, it implies that neither the pass-band blocking frequency of the digital filter according to the transfer function $H_{BEF}$ of the formula (3), nor the pass-band central frequency of the digital filter according to the transfer function $H_{BEF}$ of the formula (2) is adversely influenced by the quantization. Furthermore, the coefficient "0" implies that the output of the coefficient multiplier becomes "zero." In other words, the coefficient multiplier is not required.

As described above, since the sampling period (1/F) is selected to be a frequency higher than that of the subcarrier of the RDS modulation by 4times, the term "$Z^{-1}$" of the denominator of the transfer function for the resultant filter can be made zero. As a result, digital filters operable with high precisions can be formed by using a simple calculation, thus reducing the hardware scale of these digital filters.

Also, as explained above, the ARI modulation signal can be precisely attenuated by the first infinite impulse response type filter 20 to a high degree so that the signal 21 from which the ARI modulation signal has been attenuated can be outputted. Both the attenuated ARI modulation signal and the RDS modulation signal are extracted from the second infinite impulse response type filter 22. Then, the extracted signals are supplied as the signal 23 to the RDS demodulating circuit 24. In this case, since the signal level of the ARI modulation signal is sufficiently smaller than that of the RDS modulation signal, the costas loop PLL circuit 33 employed in the RDS demodulating circuit 24 is neither synchronized with the attenuated ARI modulation signal nor the high frequency signal of the pilot signal, but is synchronized with the RDS modulation signal. As a result, the DSB demodulation signal can be obtained as the synchronization-detection output 34 irrespective of presence or absence of the ARI modulation signal. Accordingly, the signal switching circuit employed in the conventional RDS demodulator is no longer required, which switches the synchronization-detection output 34 and the quadrature-detection output 35.

Also, since the time duration required for executing the DSB demodulation becomes constant irrespective of presence or absence of the ARI modulation signal, the RDS data can be continuously supplied under stable conditions. The RDS modulation signal which has been DSB-demodulated is demodulated in the 2-phase PSK demodulating manner by the 2-phase PSK demodulating circuit 36. At the same time, the reproduction clock sign al 26 is outputted by the clock reproducing circuit 37. The signal demodulated in the 2-phase PSK demodulating manner is differential-decoded by the differential decoding circuit 38, and is outputted as the RDS data signal 25.

It should be understood that the band block type filter is provided before the band pass type filter in the RDS data demodulator in accordance with the present invention. This is because the band block type filter has a high Q, and may be easily influenced by the group delay distortion adversely. Under such a circumstance, if the filter output of the band pass type filter, which is adversely influenced by the group delay distortion, were to be supplied to the band block type filter, the ARI signal components would not be sufficiently attenuated.

In the RDS data demodulator of the present invention, both the ARI detecting circuit and the signal switching circuit, which are required in the conventional RDS data demodulator, can be omitted. Also, the digital filter used has a highly precise filtering characteristic as compared to the conventional analog filter such as a switched capacitor circuit, since the calculations (namely, multiplication of coefficients) are carried out in accordance with the digital processing operations. Therefore, there is no fluctuation in the circuit elements. Moreover, when the infinite impulse response type filter is used, the circuit size can be reduced.

Also, since the signal processing time period of the infinite impulse response type filter is selected to be a frequency four times higher than that of the subcarrier of the. RDS signal, the term "$Z^{-1}$" of the denominator in the transfer function can be made zero. Furthermore, either the frequency of the transfer zero point or the frequency of the pass band can be made coincident with either the RDS modulation signal or the subcarrier of the ARI modulation signal. As a result, there is no quantization error, which a digital filter normally has. Also, a target signal can be attenuated, or extracted in high precision. Moreover, the hardware size can be further reduced.

It will be apparent to those skilled in the art that various modifications and variations can be made in the RDS data demodulator of the present invention without departing from the spirit or scope of the invention. Thus, it is intended that the present invention cover the modifications and variations of this invention provided they come within the scope of the appended claims and their equivalents.

What is claimed is:

1. A radio data system (RDS) data demodulator comprising:

an analog-to-digital converter for converting an analog FM signal into a digital FM modulation signal;

a first, filter having a transfer zero point at a predetermined frequency, for receiving the digital FM modulation signal and for attenuating an information modulation signal;

a second filter having a pass band characteristic at the predetermined frequency, for receiving a filter output signal from the first filter and for extracting an RDS modulation signal; and RDS demodulating means for demodulating the RDS modulation signal from the second filter to output both an RDS data signal and a reproduction clock signal used to demodulate the RDS data signal.

2. The RDS data demodulator as claimed in claim 1, wherein a signal processing time period of the first filter is carried out at a frequency four times higher than a subcarrier frequency of the RDS data signal.

3. The RDS data demodulator as claimed in claim 1, wherein a signal processing time period of the second filter is carried out at a frequency four times higher than a subcarrier frequency of the RDS data signal.

4. The RDS data demodulator as claimed in claim 1, wherein the predetermined frequency is 57 kHz.

5. The RDS data demodulator according to claim 1, wherein each of the first filter and the second filter is an infinite impulse response type filter having a transfer function of $H(Z)=(B+B_1Z^{-1}+B_2Z^{-2})/(1-A_1Z^{-1}-A_2Z^{-2})$, parameters of the transfer function of the first filter are $A_1=B_1=0$, $B=B_2$ parameters of the transfer function of the second filter are $A_1=B_1=0$, $B=-B_2$, the coefficient "$A_1$" being a factor for determining a pass-band blocking frequency, or a pass-band central frequency of the filter, the coefficient "$A_2$" being a factor for determining "Q" of the filter, and the coefficient "B" denoting an element used to determine an amplification factor of input/output in a pass band.

6. A radio data system (RDS) data demodulator comprising:

an analog-to-digital converter for converting an analog FM signal into a digital FM modulation signal;

a first filter having a transfer zero point at a predetermined frequency, for receiving the digital FM modulation signal and for attenuating an information modulation signal;

a second filter having a pass band filter characteristic at the predetermined frequency, for receiving a filter output signal from the first filter and for extracting an RDS modulation signal; and a demodulator for demodulating the RDS modulation signal from the second filter to output both an RDS data signal and a reproduction clock signal used to demodulate the RDS data signal.

7. A method for demodulating data to a radio data system comprising:

converting an analog FM signal into a digital FM signal;

attenuating an information modulation signal of a predetermined frequency within the digital FM signal;

extracting an RDS modulation signal from the digital FM signal, after the attenuation of the information modulation signal;

demodulating an RDS modulation signal extracted by the extracting operation to obtain an RDS data signal; and outputting the RDS data signal and a reproduction clock signal used to demodulate the RDS data signal, wherein the attenuating operation is executed by a first infinite impulse response type filter and the extracting operation is executed by a second infinite impulse response type filter, each of the first infinite impulse response type filter and the second infinite impulse response type filter has a transfer function of $H(Z)=(B+B_1Z^{-1}+B_2Z^{-2})/(1-A_1Z^{-1}-A_2Z^{-2})$, parameters of the transfer function of the first infinite impulse response type filter are $A_1=B_1=0$, $B=B_2$, parameters of the transfer function of the second infinite impulse response type filter are $A_1=B_1=0$, $B=-B_2$, the coefficient "$A_1$" being a factor for determining a pass-band blocking frequency, or a pass-band central frequency of the filter, the coefficient "$A_2$" being a factor for determining "Q" of the filter, and the coefficient "B" denoting an element used to determine an amplification factor of input/output in a pass band.

* * * * *